March 5, 1935.  P. C. TEMPLE  1,993,195
VALVE MECHANISM
Filed Nov. 15, 1932   2 Sheets-Sheet 1
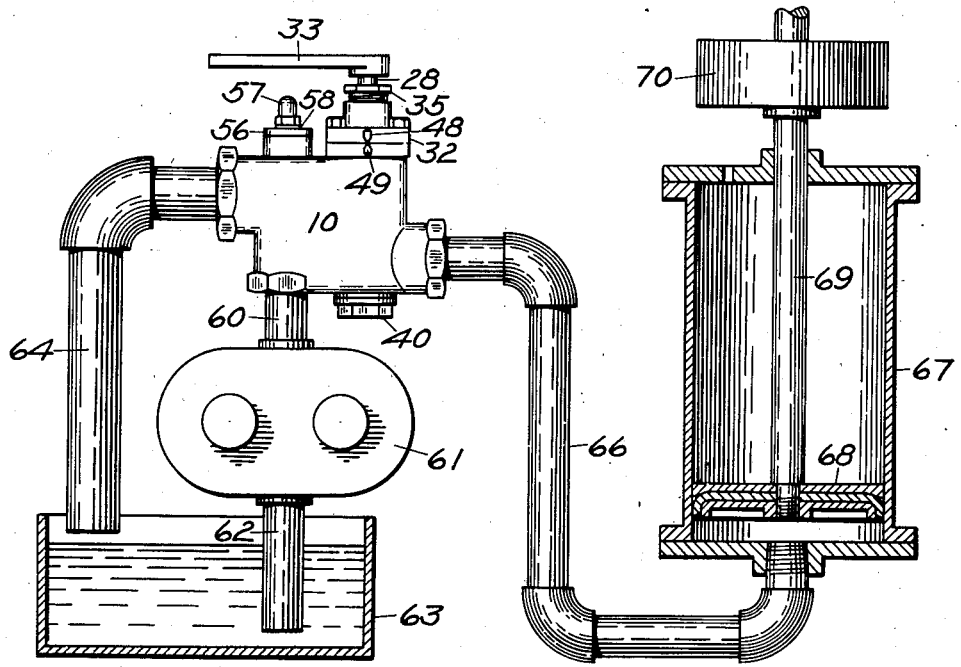
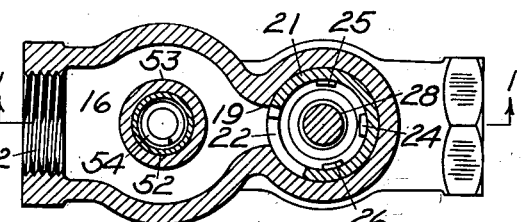
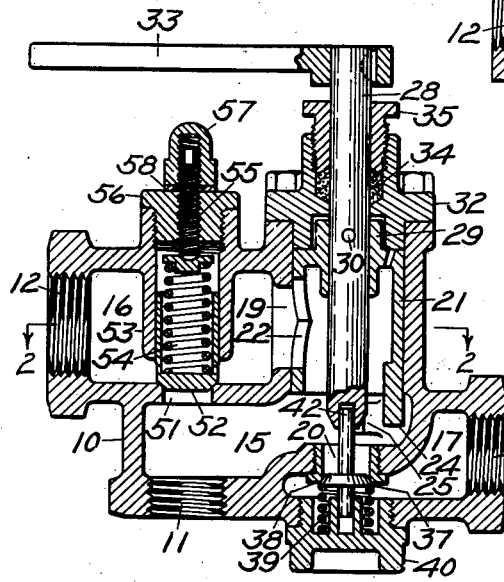
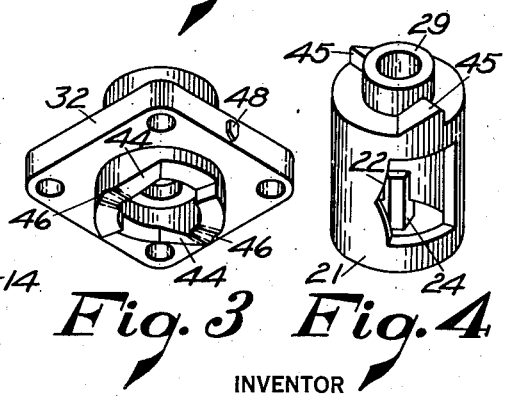
INVENTOR
PAUL C. TEMPLE
BY
Albert G. Blodgett
ATTORNEY March 5, 1935.　　P. C. TEMPLE　　1,993,195
VALVE MECHANISM
Filed Nov. 15, 1932　　2 Sheets-Sheet 2

Inventor
PAUL C. TEMPLE
By Albert G. Blodgett
Attorney

Patented Mar. 5, 1935

1,993,195

UNITED STATES PATENT OFFICE 1,993,195

VALVE MECHANISM

Paul C. Temple, Decatur, Ill., assignor to A. W. Cash Company, Decatur, Ill., a corporation of Delaware Application November 15, 1932, Serial No. 642,768

7 Claims. (Cl. 121—40)

This invention relates to valve mechanisms, and more particularly to a construction of this type which is adapted to control the movements of a hydraulic piston.

Tractors are frequently provided with graders, bulldozers, or snow plows which are operated by hydraulic motors supplied with fluid under pressure from a suitable pump, which is usually of the positive displacement type. In the past it has been customary to control the fluid flow by means of a ground key cock, with a separate relief valve in the high pressure pipe line. These key cocks have been found unsatisfactory in actual service, since they stick and soon become scored. This causes leakage and makes it impossible to hold the hydraulic piston at rest in a desired position. Moreover, the prior constructions require complicated and expensive pipe connections at installation. A further disadvantage of such an arrangement resides in the fact that the pump is operated under load at all times, whether the piston is at rest or moving. This results in a waste of power and causes needless wear on the pump.

It is accordingly one object of the present invention to provide a simple and inexpensive valve mechanism which is particularly adapted for controlling the movements of a hydraulic piston.

It is a further object of the invention to provide a valve mechanism which will operate easily at all times, which will be free from leakage, and which will serve to hold the controlled piston positively locked in any desired position.

It is a further object of the invention to provide a valve mechanism which will prevent overloading of the pump in case the controlled piston reaches the limit of its travel, and which will remove substantially all load from the pump when the piston has been brought to rest in a desired position.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts.

Fig. 1 is a section through a valve mechanism, the section being taken on the line 1—1 of Fig. 2;

Fig. 2 is a sectional on the line 2—2 of Fig. 1;

Fig. 3 is a perspective view of the valve bonnet;

Fig. 4 is a perspective view of the rotary valve;

Fig. 5 is a somewhat diagrammatic view, partly in section, showing the valve mechanism connected to other apparatus;

Figure 6:
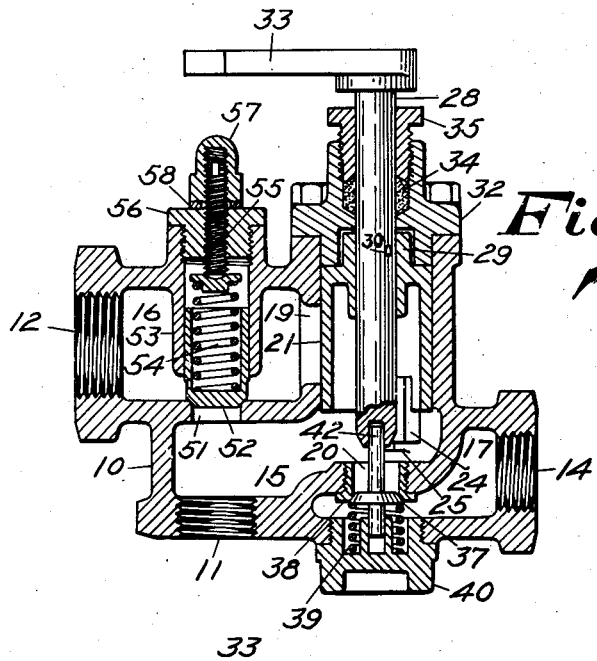
Fig. 6 is a view similar to Fig. 1, showing the position of the parts when fluid is admitted to the motor.

In the drawings I have illustrated a valve mechanism of the three-way type comprising a hollow valve body or casing 10 provided with an inlet opening 11, an outlet or exhaust opening 12, and an opening 14 which I will call, for lack of a better term, a cylinder opening. These various openings are all shown provided with screw-threads, for convenience in connecting pipes thereto. The interior of the casing 10 is divided by suitable partitions into an inlet chamber 15, an exhaust chamber 16, and an operating chamber 17. The inlet opening 11 leads directly into the inlet chamber 15, and the exhaust opening 12 leads directly from the exhaust chamber 16. The cylinder opening 14 communicates directly with the operating chamber 17. Passages 19 and 20 connect the inlet chamber 15 with the exhaust chamber 16 and the operating chamber 17 respectively.

The flow through the passage 19 is controlled by a manually operable exhaust valve 21, which, in the embodiment illustrated, is of the rotary hollow cylindrical type. This valve is rotatably supported in the casing 10, and provided with a port 22 which may be brought into or out of register with the passage 19. This port 22 is preferably V-shaped at one side to provide a smoother and more gradual control over the flow when the valve is nearly closed. A downwardly projecting lug 24 on the valve cooperates with two stops 25 and 26 on the casing to limit the rotary movement of the valve. Stop 25 limits the closing movement of the valve, and stop 26 limits the opening movement of the valve. In order that the valve may be controlled manually, I have shown a cylindrical stem 28 coaxial with the valve and fastened to a boss 29 at the upper end of the valve by means of a pin 30. The stem 28 extends upwardly through a bonnet 32, and carries a handle 33 on its upper end. The bonnet 32 is fastened to the casing 10, and is recessed to receive packing 34 which is compressed around the stem 28 by means of a gland 35 screw-threaded to the bonnet. The port 22 is made sufficiently extensive to ensure that the exhaust valve will be open both in the intermediate or neutral position illustrated and in the extreme position determined by the stop 26.

The flow through the passage 20 is controlled by a valve 37, which is preferably unbalanced and arranged to open in the direction of flow out of the inlet chamber 15. The valve 37 as illustrated is of the poppet type and is associated with an annular valve seat 38. The valve is urged upwardly toward closed position by means of a coiled compression spring 39 which is supported in a cap 40 screw-threaded to the casing 10 in direct alignment with the valve.

It will now be apparent that if fluid is supplied under pressure to the inlet opening 11, and if the exhaust valve 21 is closed, the pressure in the inlet chamber 15 will increase and open the unbalanced valve 37 against the force of the spring 39, thus allowing fluid to flow from the inlet chamber through the passage 20 into the operating chamber 17. In order that the valve mechanism may be utilized for actuating such a device as a hydraulic piston or motor for example, it is necessary to provide means which will allow the fluid to flow in the opposite direction through the passage 20 when this is desirable. This is accomplished by opening the unbalanced valve 37 and at the same time opening the exhaust valve 21, thus decreasing the pressure in the inlet chamber 15.

In the preferred construction the valves 21 and 37 are interconnected in such a way that the valve 21 may be opened alone, or both the valves may be opened at the same time, depending upon the position of the handle 33. As shown in the drawings, the two valves are mounted in direct axial alignment, and the parts are so constructed and arranged that when the exhaust valve 21 is turned to the limit of its travel in the opening direction, as determined by the stop 26, it will move axially and force open the poppet valve 37. This valve 37 is provided with a coaxial stem 42 extending in both directions with its lower end slidable in the cap 40 and its upper end slidable in the lower end of the valve stem 28. This construction forms a connection between the valves and provides a suitable guide means for the poppet valve. A slight lost motion is allowed in the axial direction to ensure proper seating of the poppet valve. The desired axial movement of the exhaust valve 21 may be brought about by utilizing cooperating cam surfaces on the valve and the valve bonnet 32. As illustrated, the bonnet 32 is provided with two downwardly projecting and diametrically opposed cams 44 (Fig. 3), and the valve 21 is provided with two upwardly projecting and diametrically opposed cam followers 45 (Fig. 4) which strike the cams 44 when the valve approaches the limit of travel in the opening direction and thus force the valve and its stem downwardly, thereby opening the valve 37. Each cam 44 is formed with a small notch 46 so located that the cam followers 45 will enter the notches at the limit of the opening valve movement and thus hold the valve in this position. It is obvious that the cams could be formed on the valve, and the cam followers formed on the valve bonnet. Moreover, only one cam and one cam follower need be provided. In order to ensure that the bonnet 32 will be assembled in the proper relation with the casing 10, so that the cams 44 will be correctly positioned, I have provided registering markers 48 and 49 (Fig. 5) on the bonnet and casing respectively.

When a valve mechanism of this type is used to control a fluid actuated piston, it frequently happens that the piston is allowed to reach the limit of its stroke before the valve 21 is opened. In order to prevent damage to the valve mechanism or associated apparatus under these conditions, I preferably provide a suitable device for relieving any excess fluid pressure which may occur. In the embodiment illustrated, an additional passage 51 is provided to afford communication between the inlet chamber 15 and the exhaust chamber 16, and this passage is normally closed by means of a relief valve 52 which is slidably supported in a guideway 53 integral with the casing 10. The relief valve is recessed to receive a coiled compression spring 54, and the outer end of the spring is supported on an adjustable screw 55 which is threaded through a cap 56. This cap is screw-threaded to the casing 10 in alignment with the guideway 53. A small cap 57 is threaded to the outer end of the screw 55, and serves to clamp an annular gasket 58 against the cap 56, thus preventing external leakage of fluid. The relief valve 52 is subjected to the pressure in the inlet chamber 15, and whenever this pressure becomes sufficient to compress the spring 54 the valve will open and allow fluid to flow through the passage 51.

Referring now to Fig. 5, I have there shown my improved valve mechanism connected to other apparatus. The inlet opening 11 is connected by a pipe 60 with the discharge port of a pump 61, which may be of the rotary positive displacement type. The suction port of the pump is connected by a pipe 62 with a reservoir 63 containing a suitable liquid, such as oil. A pipe 64 leads from the exhaust opening 12 to the reservoir 63. The cylinder opening 14 is connected by a pipe 66 to the lower end of a cylinder 67, in which is mounted a slidable single acting piston 68. A piston rod 69 extends upwardly from the piston 68 and through the upper end of the cylinder 67. A weight 70 is shown mounted on the piston rod. The entire construction may, if desired, be mounted upon a tractor (not shown) and the piston rod 69 may be connected to any device which is to be actuated.

Figure 7:
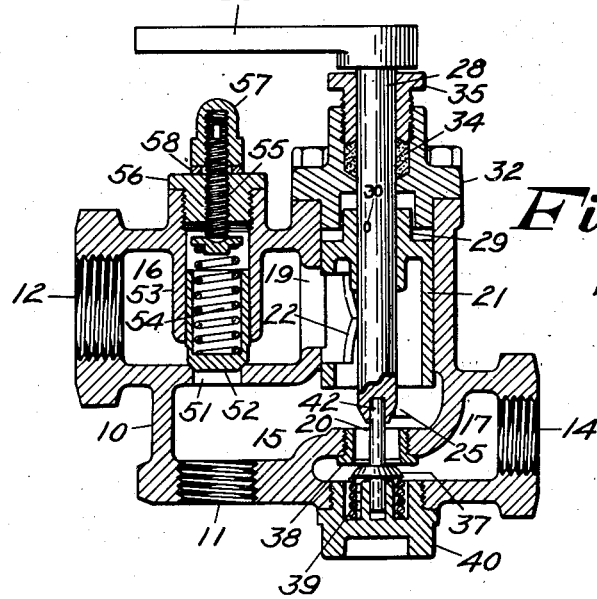
Fig. 7 is a view similar to Fig. 1, showing the position of the parts when fluid is exhausted from the motor.

The operation of the invention will now be apparent from the above disclosure. The pump 61 is driven by a suitable source of power, and draws oil through the pipe 62 from the reservoir 63 and delivers the oil through the pipe 60 to the inlet chamber 15. So long as the exhaust valve 21 is in the neutral position illustrated in Fig. 1, the oil will flow from the chamber 15 through the valve port 22 and the passage 19 to the exhaust chamber 16, and thence through the pipe 64 back to the reservoir. Under these conditions, the pump will merely circulate the oil under practically no pressure, and a minimum of power is required. The poppet valve 37 will be tightly closed, holding the piston 68 stationary in the cylinder 67. If now the handle 33 is turned in a counter-clockwise direction until the lug 24 strikes the stop 25, the valve 21 will be closed, as shown in Fig. 6, and the oil pressure in the inlet chamber 15 will increase, thus forcing open the poppet valve 37. This will allow oil to flow through the pipe 66 to the cylinder 67, causing the piston 68 to move upwardly against the resistance of weight 70 and/or any other load which may be connected to the piston rod 69. If the handle 33 is turned in a clockwise direction until the lug 24 strikes the stop 26, the valve 21 will be opened. Moreover, the cam followers 45 will strike the cams 44 on the valve bonnet 32, thus moving the valve 21 and the valve stem 28 downwardly and opening the poppet valve 37, as shown in Fig. 7. Under these conditions, since the passage 19 is open, there will be no substantial pressure in the inlet chamber 15, and the weight 70 will cause the piston 68 to move downwardly and force the oil from the cylinder 67 through the pipe 66 and passage 20 into the inlet chamber and thence through the passage 19 to the exhaust chamber. The spring 39 will hold the cam followers 45 in the notches 46, so that the parts will remain in their respective positions until changed manually.

The piston 68 can be stopped in any desired position simply by returning the rotary exhaust valve to its neutral position. This immediately allows the poppet valve to close and prevents further movement of the piston. The speed of movement of the piston can be varied as desired by means of the handle 33, the maximum speed being obtained when the handle is moved to either extreme position. If the handle 33 is adjusted to open the valve 21 a slight amount, there will still be an appreciable pressure in the inlet chamber 15, and the piston will move upward slowly. If the handle is adjusted so that the cam followers 45 are part way along the slope of the cams 44, the poppet valve will be held slightly open, and the piston will move downward slowly. In case the piston reaches the upper end of the cylinder before the handle is returned to neutral position, the oil pressure in the inlet chamber 15 will increase, forcing open the relief valve 52 against its spring 54 and thus allowing the oil to flow to the exhaust chamber 16 through the passage 51. The spring 54 should be adjusted for a relief pressure slightly higher than the pressure required to actuate the piston 68 under normal load conditions.

The entire valve mechanism is self-contained, and requires a minimum of pipe connections, thus simplifying the installation and reducing the space occupied. No load is applied to the pump except when the piston 68 is actually performing work. The poppet valve 37 will positively prevent lowering of the piston except at the will of the operator. If the mechanism is mounted on a tractor and used to operate some such device as a snow plow, it is possible to leave the operating handle 33 in the lowering position, which will allow the piston to float freely with the snow plow following the contour of the ground. The rotary valve will operate freely at all times without sticking, since it is entirely immersed in oil and can be made a reasonably loose fit without affecting the operation.

Having thus described my invention, what I claim as new and desire to secure by Letters Patent is:

1. A valve mechanism comprising a hollow casing, partitions dividing the interior of the casing into an inlet chamber, an exhaust chamber and an operating chamber, a passage leading from the inlet chamber to the exhaust chamber, an exhaust valve rotatably mounted in the casing and arranged to control the flow in the passage, the exhaust valve having a closed position, an extreme open position and an intermediate position in which it is also open, a passage connecting the inlet chamber with the operating chamber, an unbalanced valve in the last mentioned passage arranged to be opened by an increase in the fluid pressure in the inlet chamber, and a mechanical connection between the valves which serves to open the unbalanced valve whenever the exhaust valve is rotated to its extreme open position.

2. A valve mechanism comprising a hollow casing, partitions dividing the interior of the casing into an inlet chamber, an exhaust chamber and an operating chamber, a passage leading from the inlet chamber to the exhaust chamber, a cylindrical exhaust valve rotatably mounted in the casing and arranged to control the flow in the passage, the exhaust valve having a closed position and two open positions, a passage connecting the inlet chamber with the operating chamber, an unbalanced valve in the last mentioned passage arranged to be opened by an increase in the fluid pressure in the inlet chamber, means to actuate the exhaust valve, a mechanical connection between the valves, and means to move the exhaust valve axially when it is rotated to a predetermined open position and thus force open the unbalanced valve.

3. A valve mechanism comprising a hollow casing, partitions dividing the interior of the casing into an inlet chamber, an exhaust chamber and an operating chamber, a passage leading from the inlet chamber to the exhaust chamber, a hollow cylindrical exhaust valve rotatably mounted in the casing and having a port which can be brought into or out of register with the passage, means to rotate the valve between a closed and an extreme open position, the port being of such proportions that the valve will also be open in an intermediate position, a passage connecting the inlet chamber with the operating chamber, an unbalanced valve in the last mentioned passage arranged to be opened by an increase in the fluid pressure in the inlet chamber, the unbalanced valve being substantially aligned with the exhaust valve, a mechanical connection between the valves, and cam means to move the exhaust valve axially toward the unbalanced valve when the exhaust valve is turned to its extreme open position and thus force open the unbalanced valve.

4. A valve mechanism comprising a hollow casing, partitions dividing the interior of the casing into an inlet chamber, an exhaust chamber and an operating chamber, a passage leading from the inlet chamber to the exhaust chamber, a hollow cylindrical exhaust valve rotatably mounted in the casing with its interior communicating with the inlet chamber and having a port which can be brought into or out of register with the passage, means to rotate the valve between a closed and an extreme open position, the port being of such proportions that the valve will also be open in an intermediate position, a bonnet fastened to the casing at one end of the valve, a stem connected to and coaxial with the valve, the stem extending through the bonnet, a passage connecting the inlet chamber with the operating chamber, a poppet valve in the last mentioned passage arranged to be opened by an increase in the fluid pressure in the inlet chamber, the poppet valve being substantially aligned with the exhaust valve, a spring urging the poppet valve toward closed position, means providing cooperating cam surfaces on the exhaust valve and bonnet which cause the exhaust valve to move axially toward the poppet valve when the exhaust valve is turned to its extreme open position, and means associated with the exhaust valve which serves to force open the poppet valve when the exhaust valve in thus moved axially.

5. A valve mechanism comprising a casing, a rotary cylindrical valve within the casing, a bonnet fastened to the casing at one end of the valve, a stem connected to and coaxial with the valve, the stem extending through the bonnet, a poppet valve within the casing and axially aligned with the rotary valve, a spring urging the poppet valve toward closed position, means providing cooperating cam surfaces on the rotary valve and bonnet which cause the rotary valve to move axially toward the poppet valve when the rotary valve is turned to a predetermined position, and means associated with the rotary valve which serves to force open the poppet valve when the rotary valve is thus moved axially.

6. A valve mechanism comprising a casing having a passage, a rotary cylindrical valve within the casing and provided with a port which may be brought into and out of register with the passage by rotation of the valve, a poppet valve within the casing and biased toward closed position, means to move the rotary valve automatically in an axial direction when it is turned to a predetermined position, and a mechanical connection between the valves which serves to open the poppet valve in opposition to its bias when the rotary valve is thus moved axially.

7. A valve mechanism comprising a casing having a passage, a rotary cylindrical valve within the casing and provided with a port which may be brought into and out of register with the passage by rotation of the valve, a poppet valve within the casing and axially aligned with the rotary valve, the poppet valve being biased toward closed position, means to move the rotary valve automatically in an axial direction when it is turned to a predetermined position, and a mechanical connection between the valves which serves to open the poppet valve in opposition to its bias when the rotary valve is thus moved axially.

PAUL C. TEMPLE.